United States Patent [19]

Driver

[11] 4,311,406
[45] Jan. 19, 1982

[54] HYBRID PISTON PIN

[75] Inventor: Howard D. Driver, Raleigh, N.C.

[73] Assignee: Exxon Research & Engineering Co., Florham Park, N.J.

[21] Appl. No.: 51,682

[22] Filed: Jun. 25, 1979

[51] Int. Cl.³ .......................................... F16C 11/00
[52] U.S. Cl. ................................. 403/161; 403/150; 92/187
[58] Field of Search ............... 403/150, 151, 152, 161, 403/162, 404, 221, 222, 228; 92/187

[56] References Cited

U.S. PATENT DOCUMENTS

| | | |
|---|---|---|
| 1,670,564 | 5/1928 | Breer . |
| 2,067,714 | 1/1937 | Kylen . |
| 3,510,934 | 5/1970 | Koelichen . |
| 3,550,247 | 12/1970 | Evans et al. . |

FOREIGN PATENT DOCUMENTS

| | | | |
|---|---|---|---|
| 1900932 | 8/1970 | Fed. Rep. of Germany | 92/187 |
| 687544 | 4/1930 | France | 403/228 |

Primary Examiner—Andrew V. Kundrat
Attorney, Agent, or Firm—Joseph J. Dvorak

[57] ABSTRACT

A light-weight, high-strength composite pin for use in pin-jointed reciprocating mechanisms and a method of preparation thereof is provided. Basically, the pin has a tubular metal sleeve and an interior fiber-reinforced resin core. At least 50% of the fibers in the core are continuous fibers which are oriented at a predetermined specific angle of orientation ranging, in general, from 0° to about ±25°. Indeed, in a preferred embodiment of the present invention, the fibers are cross-plied at an angle of orientation of from about 5° to about 12°.

6 Claims, 4 Drawing Figures

HYBRID PISTON PIN

FIELD OF THE INVENTION

This invention relates to pins for pin-jointed reciprocating mechanisms and more particularly to light-weight, fiber-reinforced piston pins.

BACKGROUND OF THE INVENTION

Light-weight, high-strength composite structures are being employed in an ever wider variety of applications, particularly where the benefits to be gained by use of such materials clearly offset the generally higher costs associated with them. One area of increasing use of composite materials is in automotive components where use of light-weight, high-strength components can be translated into higher fuel efficiencies. Examples of such light-weight, high-strength components include leaf springs, stabilizer bars, body parts and the like.

Another potential automotive application for light-weight, high-strength composite structures is in pin-jointed reciprocating mechanisms such as piston pins and the like. For example, approximately 50% of the forces encountered by a reciprocating engine component is the result of the component's own weight. Therefore, a reduction in weight leads to a reduction in load; and, this allows a further reduction in weight and increased efficiency.

New light-weight, high-strength pins for pin-jointed reciprocating components have potential utility in other areas as well. For example, where engine performance is of paramount concern, such as with racing vehicles, composite piston pins and the like can result in greater power output for a given engine design. Even small engines used, for example, on chain saws and the like would be vastly improved by use of light-weight, high-strength components. The physically debilitating vibrations endured by the operator of such mechanisms can be significantly reduced by use of lighter weight pins for such pin-jointed reciprocating components. Potentially, light-weight, high-strength reciprocating pins for compressors can afford considerable economic operating benefits.

Despite this myriad of potential uses for such light-weight, composite, reciprocating components, there has been very little progress in the area of developing suitable reciprocating composite parts. With respect to piston pins as a specific example, the high temperatures and high repetitive loading on such a part have inhibited the commercial development of light-weight, high-strength piston pins.

SUMMARY OF THE INVENTION

Briefly stated, the present invention contemplates a pin for use in a pin-jointed mechanism, especially a piston pin for a reciprocating engine, formed of a tubular metal sleeve surrounding a fiber-reinforced resin core. In general, the fibers of the core are continuous fibers which are oriented substantially at an angle ranging from between about 0° to about ±25° with respect to the longitudinal axis of the pin. In a preferred embodiment of the present invention, the continuous fibers in the fiber-reinforced resin core are cross-plied at an angle ranging from between about 5° to about 12° with respect to the longitudinal axis of the pin.

In accordance with another aspect of the present invention, an improved pin for use in a pin-jointed reciprocating mechanism is prepared by forming a fiber-reinforced core member having continuous fibers oriented at a predetermined angle of orientation generally between about 0° and ±25° with respect to the longitudinal axis of the core member and inserting said core member into a metal tubular sleeve, the sleeve and core being sized so as to provide for a snug fit of the core member in the tubular sleeve; and, thereafter, heating the assembly at elevated temperatures and for times sufficient to postcure the resin within the tubular metal sleeve.

These and other embodiments of the present invention will become apparent upon a further reading of the specification in conjunction with the accompanying drawings.

DETAILED DESCRIPTION OF THE INVENTION

Figure 1:
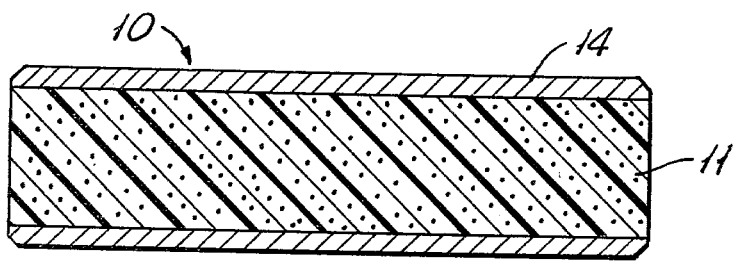
FIG. 1 is a longitudinal sectional view of a piston pin constructed in accordance with the present invention.

As indicated hereinabove, the present invention is directed toward a composite pin for pin-jointed reciprocating mechanisms. Since a particularly preferred application for the pin of this invention is as a piston pin for internal combustion engines, reference hereinafter will be made specifically to a piston pin. It should be understood, however, that all matters set forth herein are to be interpreted in an illustrative and not a limiting sense.

Referring now to the drawings, it should be noted that like reference characters designate corresponding parts throughout the several drawings and views.

Figure 2:
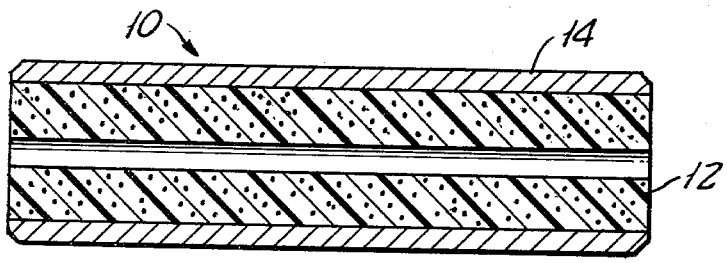
FIG. 2 is a longitudinal sectional view of the particularly preferred piston pin constructed in accordance with the present invention.

The piston pin 10 of the present invention is formed from a fiber-reinforced core member which may be a solid core member 11 (see FIG. 1) but preferably is a tubular core member 12 (see FIG. 2). The core member (11 or 12) is fitted within a tubular metal sleeve 14.

The metal sleeve 14 may be formed by numerous metals and metal alloys such as steel, aluminum and titanium. Preferably the metal sleeve is formed from a steel tubing such as 4130 steel tubing which has been heat treated to an appropriate strength and Rockwell hardness. For example, where wear is not as significant as strength, the metal sleeve may be heated to an ultimate strength of 200,000 psi. If wear is more important, then metal sleeve 14 is heated to a Rockwell hardness of C-55 or C-56, for example. The extent of heat treatment obviously is a matter of choice depending upon the use to which the pin is being placed. The method of heat treating is well known in the art and is not a part of this invention.

The core member (11 or 12) of the piston pin 10 of the present invention is formed from a fiber-reinforced resin material. In the practice of the present invention, the fibers are continuous fibers and are selected from typical fiber-reinforcing materials such as boron, carbon, graphite, glass, polyaramids and mixtures thereof. Preferably, however, the fibers are selected from carbon and graphite fibers, and more particularly from carbon and graphite fibers having a Youngs modulus of about $32 \times 10^6$ psi and a tensile strength of about 400,000 psi or greater.

As indicated herein, the continuous fibers are embedded in a resin matrix. In general, any resin may be employed, such as thermoplastic and thermoset resins, although it is preferred that the resin matrix be a thermosetting resin.

Suitable thermosetting resin materials include epoxy, polyimide and polyester resins.

The epoxy resins are polyepoxides which are well known condensation products or compounds containing oxirane rings with compounds containing hydroxyl groups or active hydrogen atoms such as amines, acids and aldehydes. The most common epoxy resin compounds are those of epichlorohydrin and bis-phenol and its homologs. The polyester resins are polycondensation products of polybasic acids with polyhydric alcohols. Typical polyesters include polyterephthalates such as polyethylene terephthalate. The polyimide resins are derived from pyromallitic dianhydride and aromatic diamines.

The amount of fiber in the resin will vary depending upon the choice of fiber or fibers, the strength and weight characteristics of the ultimate part and the like. In general, for an internal combustion engine piston pin, from about 50 volume % to about 65 volume % and preferably from 60 volume % to about 65 volume % of carbon fiber in the resin will be employed. Particularly preferred is from 60 to 65 volume % of continuous carbon or graphite fibers in an epoxy resin matrix.

As should be readily appreciated, randomly oriented staple lengths of fiber filaments may also be included. In the event that randomly oriented fibers are included, at least greater than half of the fibers in the fiber-reinforced resin matrix core member (11 or 12) will be continuous specifically oriented fiber-reinforcing material.

The continuous fibers in the core member (11 or 12) of the piston pin of the present invention are oriented at a predetermined angle of orientation which ranges generally from about 0° to about ±25° with respect to the longitudinal axis of the core. Indeed, it is particularly preferred that the continuous fibers be oriented at an angle ranging from between about ±5° to about ±12° with respect to the longitudinal axis of the core. As will be readily appreciated, the "±" designation indicates that the fibers are cross-plied; that is, for an angle of orientation say of ±10°, half the fibers are oriented at ±10° and half the fibers are oriented at −10° with respect to the longitudinal axis of the core. This cross-ply orientation can be seen, for example, in FIGS. 3 and 4.

In fabricating the piston pin of this invention, a core member (11 or 12) is provided having the fibers 21 therein at the requisite angle of orientation with respect to the longitudinal axis of the piston pin. For example, when the fibers in the core member are to be oriented at 0° with respect to the longitudinal axis of the piston pin, the continuous fibers are passed through an appropriate resin mixture where the fibers are impregnated with an appropriate amount of resin and then through a die where the fibers and resin are consolidated and cured into a cylindrically shaped core member having the fibers therein oriented at 0° with respect to the longitudinal axis thereof. Optionally the resin bath through which the fibers are pulled may contain staple length fiber filaments so that the resulting cylindrically shaped core member will have randomly oriented fibers as well as continuous fibers oriented at 0° with respect to the longitudinal axis thereof.

Figure 3:
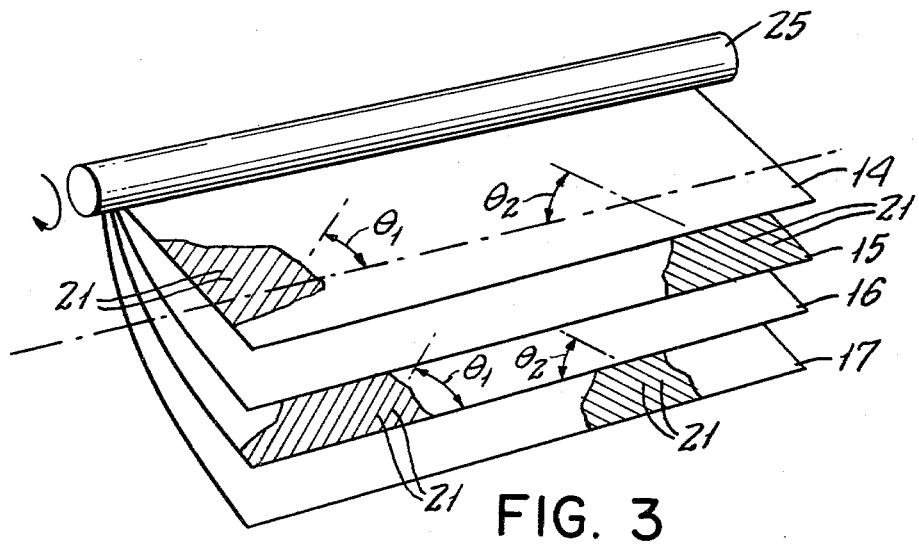
FIG. 3 is an isometric drawing, partly in perspective and partly cut away, illustrating a preferred method of preparing the core member of the invention.

In the instance where the fibers in the core are cross-plied at a predetermined angle of orientation, such as in a particularly preferred embodiment of the present invention, the core is formed from a plurality of sheets of resin impregnated, continuous, unidirectional fibers by first cutting the sheets in a predetermined flat pattern, generally in the shape of a rectangle. Then the sheets are arranged, one on top of the other, in laminate form in a manner such that the fibers in each adjacent layer are cross-plied with respect to each other. For example, as is shown in FIG. 3, the unidirectional fibers 21 in the various layers of sheet material 14, 15, 16 and 17 are oriented at a specific predetermined angle with respect to the longitudinal axis of the sheet material. In layers 14 and 16, the fibers 21 are oriented at a specific angle, $\theta_1$, with respect to the longitudinal axis of the sheet material. In layers 15 and 17, the fibers are oriented at a specific angle, $\theta_2$, with respect to the longitudinal axis. The magnitudes of $\theta_1$ and $\theta_2$ are the same but of different directions. Since the various layers of sheet material also are arranged in alternating sequence, the fibers in adjacent layers will be cross-plied with respect to each other. These layers of sheet material then are wound around a mandrel, such as mandrel 25. After so winding, the sheets are held in place on the mandrel by cellulose tape or an appropriately shaped tool which serves, in effect, as a mold. Thereafter, the entire assembly is heated so as to cure the resin.

The temperature at which the assembly is heated for curing depends, of course, on a number of factors, including the type of resin which is used to impregnate the fibers. These temperatures are well known. Typically for epoxy resin impregnated fibers the temperature will be in the range of from about 100° C. to about 180° C. and preferably about 180° C. Similarly, the time for heating will depend upon the curing temperature employed for the particular resin used.

After curing, the assembly is removed from the mold, the mandrel is removed, and the resultant core member is inserted in the tubular metal sleeve 14.

Since a number of plies or layers of fiber-reinforced sheet material that are employed in making up the core member 12 are used in amounts sufficient to provide a core having a sufficiently large diameter to provide a tight fit of the core within sleeve 14, it is sometimes necessary to grind the exterior surface of the cylindrical core member 12 so as to be able to fit the core within the sleeve 14 with the requisite snugness. Indeed, slight oversizing of the core followed by center-less grinding is a very desirable method of assuring that the core 12 will have the requisite dimensions for a snug fit within sleeve 14.

Optionally, prior to inserting the core (11 or 12) into sleeve 14, an adhesive can be applied to the inner surface of the sleeve 14, the outer surface of the core or both. Typically a thixotropic paste-type epoxy adhesive is used such as Hysol, EA 929 sold by the Hysol Division of Dexter Corporation, Pittsburgh, Calif.

Figure 4:
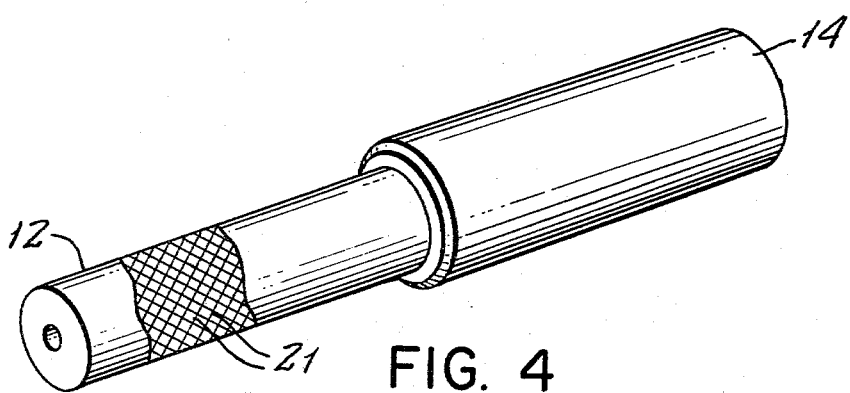
FIG. 4 is yet another isometric drawing, partly in perspective and partly cut away, illustrating the method of preparing a preferred piston pin in accordance with the present invention.

After pressing the core into the metal tube 14, such as shown in FIG. 4, the assembly is then heated, for example, in an oven for post-curing and stress relief. Thus, the assembly is heated at temperatures in the range of about 125° C. to 175° C., and preferably at 150° C., for times ranging from about 12 to 20 hours and preferably 14 to 18 hours.

After the post-curing step, the assembly can be ground to provide a chamfer and a uniform O.D. if such is necessary.

To further illustrate the present invention, reference is made herein to the following examples.

EXAMPLE 1

Following the procedure outlined above, a piston pin for a small block, 8 cylinder automotive engine was fabricated. The piston pin (sleeve and core) had a length of 3.008 inches. The core 12 had an inside diameter of 0.5 inches and an outside diameter of between 0.8675 inches. The outer diameter of sleeve 14 was 0.9271 to 0.9272 inches. The inner diameter of sleeve 14 was sufficient to accommodate a snug fit of the core 12 when pressed into the sleeve. Sleeve 14 was made from 4130 steel having a Rockwell hardness of C-56. A 45° chamfer was provided in each end of sleeve 14. The core 12 was made from continuous carbon fiber reinforced epoxy resin. The angle of orientation of the continuous carbon fibers was ±10°. The pin so formed was found to be 50% lighter in weight than the standard all metal piston pin. The pin was tested in a servo-hydraulic fatigue testing machine and at one million cycles the pin had not broken.

EXAMPLE 2

In this instance, a piston pin for a one cylinder racing motor was fabricated as set forth above. The pin (core and sleeve) had a length of 1.900 inches. The core 12 had an inside diameter of 0.125 inches and an outer diameter of 0.45 inches. The outside diameter of the sleeve 14 was 0.49 inches. The core was pressed into the sleeve and held there snugly. Sleeve 14 had been heat treated to an ultimate strength of 200,000 psi and a Rockwell hardness of C-44. A 45° chamfer was provided in both ends of sleeve 14.

The core 12 was made from continuous carbon fibers in an epoxy matrix. The fiber orientation in the core was ±10°. The pin fabricated provided a weight saving of 33%. The pin was field tested in the racing vehicle for over one million cycles without failure.

What is claimed is:

1. A piston pin for a pin-jointed reciprocating mechanism comprising:
   a tubular metal sleeve surrounding a fiber-reinforced resin core, at least 50% of said fibers being continuous carbon fibers oriented at an angle ranging from about 0° to about ±25° with respect to the longitudinal axis of the pin, said sleeve and said core being coextensive in length.

2. The pin of claim 1 wherein said metal sleeve is selected from aluminum, titanium and steel, and alloys thereof.

3. The pin of claim 2 wherein said metal sleeve is steel.

4. The pin of claim 3 wherein all of said fibers are continuous carbon fibers and are oriented at an angle of from about ±5° to about ±12°.

5. A pison pin comprising:
   a tubular metal sleeve and a fiber-reinforced resin core, said sleeve and said core being coextensive in length;
   at least 50% of said fibers in said core being continuous carbon fibers, said fibers being oriented at between about ±5° to about ±12° with respect to the longitudinal axis.

6. The pin of claim 5 wherein said resin is an epoxy resin.

* * * * *